Dec. 3, 1968    J. T. ZELLERS, JR    3,414,397

SHEET GLASS MANUFACTURE

Filed April 2, 1965    2 Sheets-Sheet 1

INVENTOR.
James T. Zellers, Jr.
BY Nobbe & Swope
ATTORNEYS

Dec. 3, 1968

J. T. ZELLERS, JR 3,414,397

SHEET GLASS MANUFACTURE

Filed April 2, 1965

INVENTOR.
James T. Zellers, Jr.
BY Nobbe & Swope
ATTORNEYS

United States Patent Office 3,414,397
Patented Dec. 3, 1968

3,414,397
SHEET GLASS MANUFACTURE
James T. Zellers, Jr., Charleston, W. Va., assignor to
Libbey-Owens-Ford Glass Company, Toledo, Ohio,
a corporation of Ohio
Filed Apr. 2, 1965, Ser. No. 445,025
10 Claims. (Cl. 65—196)

ABSTRACT OF THE DISCLOSURE

A cylindrical muffle positioned above and extending transversely of the stream of molten glass flowing into the drawing area of a sheet glass furnace, with a support member beneath each end of the muffle for supporting same and means associated with the support members for supplying heat to the molten glass adjacent the edges of the stream.

---

The present invention relates broadly to the manufacture of sheet or window glass by drawing the same from a mass of molten glass. More particularly it has to do with improvements in apparatus for controlling the temperature in the molten glass and the surrounding atmosphere as the glass advances into the drawing or sheet forming area.

An important object of the invention is to provide means for maintaining more uniform temperature conditions across the width of the furnace in a stream of molten glass in this area.

Another object is to provide improved apparatus of the above character which includes means for equalizing the temperature laterally across the stream of molten glass to bring about an overall uniformity of temperature in the glass.

Another object is to provide improved temperature control apparatus that includes a cover member or lip-tile of hollow construction extending over the molten glass in the working receptacle of a sheet glass furnace and having a cylindrical configuration which is resistant to warpage while influencing the temperature of the molten glass therebeneath.

Other objects and advantages of the invention will become more apparent during the course of the following description when taken in connection with the accompanying drawings.

In the drawings, wherein like numerals are employed to designate like parts throughout the same:

Figure 1:
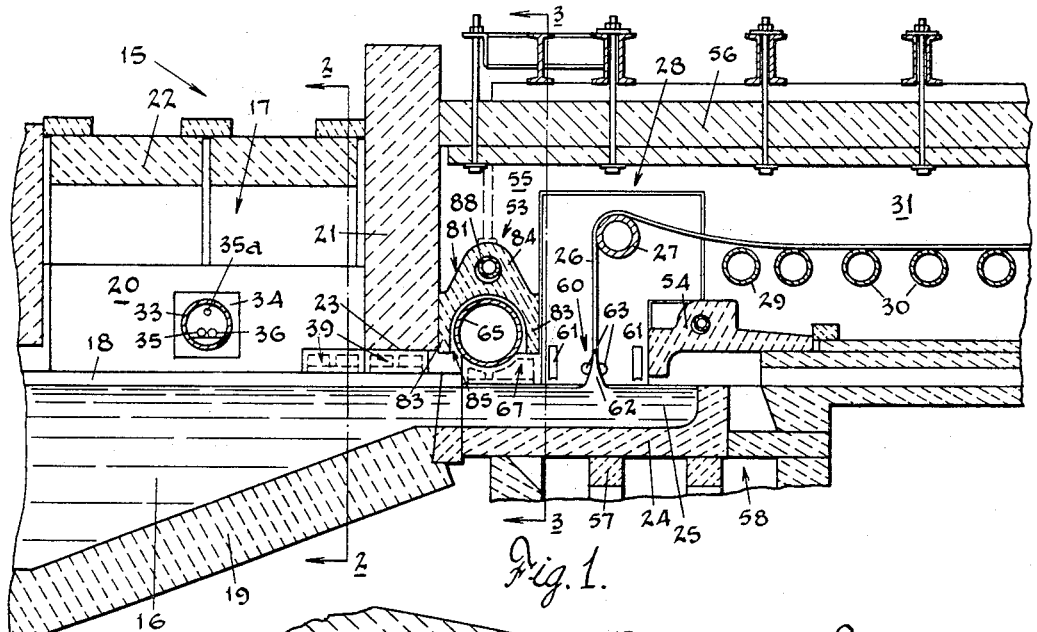
FIG. 1 is a fragmentary vertical section taken along the longitudinal axis of a sheet glass drawing furnace.

With reference now to the drawings and particularly to FIG. 1, the numeral 15 generally designates the outlet end of a continuous window glass tank-furnace within which a mass of glass is melted, refined and cooled to proper working temperature during movement therethrough. Thus a stream of molten and refined glass, indicated by the numeral 16, flows through a cooling chamber 17 between side walls 18 and over a floor or bottom 19. The cooling chamber 17 also includes upper walls, one being indicated at 20, an end wall 21 and a roof 22. From the outlet end of the cooling chamber, the glass moves beneath the exit arch 23 of end wall 21 into a working receptacle, shown here as a draw pot 24 of a typical Colburn type machine, within which it forms a relatively shallow pool 25 from which a continuous sheet or ribbon 26 is drawn.

Generally speaking, the glass sheet or ribbon is conventionally drawn vertically upward from the pool of molten glass and then, while the ribbon is still in a semi-plastic condition although substantially set in its final sheet form, it is deflected into a horizontal plane over a bending roll 27, in a drawing chamber 28, and then carried over an intermediate roll 29 onto rolls 30 located in a flattening chamber 31. The glass, in sheet or ribbon form, continuous its movement into and through an annealing lehr (not shown).

It has long been known that in order to prevent undesirable thickness variations in the sheet or ribbon, the temperature of the molten glass must be uniform across the width of the furnace as it enters the draw pot and approaches the zone of sheet formation; and also, that there is a natural tendency for the mass of molten glass to cool more rapidly along its marginal area due to loss of heat by conduction through the furnace side walls. Therefore, as the molten glass flows through the cooling chamber 17 wherein its temperature is gradually brought down to the level necessary for drawing into sheet or ribbon form, it is highly desirable to set up and maintain an equilibrium of temperature with the marginal areas at substantially the same temperature as the central area of the molten stream.

According to this invention such thermal conditioning of the molten glass is assisted by the provision of a temperature controlling member disposed above the surface of the glass in the cooling chamber and adapted to modulate the temperature of the heated air beneath the roof 22 and to regulate the temperature of the molten glass. As herein provided, a tubular member or muffle 33 is located transversely between the walls 20 of the cooling chamber, in which its oppositely disposed ends are carried in setting blocks 34 so that the muffle can be periodically rotated whenever necessary to compensate for warping. The muffle 33 is circular in cross-section and is preferably formed by centrifugal casting processes which ensure that thickness of the wall will be entirely uniform so that subsequent machining is unnecessary. By means of pipes 35 and 36, a coolant, such as water, may be passed through the muffle to absorb heat from and impose a cooling influence on the surface of the molten glass. The pipes 35 and 36 are conventionally joined by a U-shaped fitting (not shown) at one of their common ends in order that the coolant can be introduced and exhausted from one side of the furnace. This also provides a way in which the influence of the coolant can be directed to specific areas, as above the central area of the glass which is known to be at a higher temperature than the edges. Burners (not shown) may also be introduced into the ends of the muffle to provide heat to the cooler edge areas of the glass.

Figure 2:
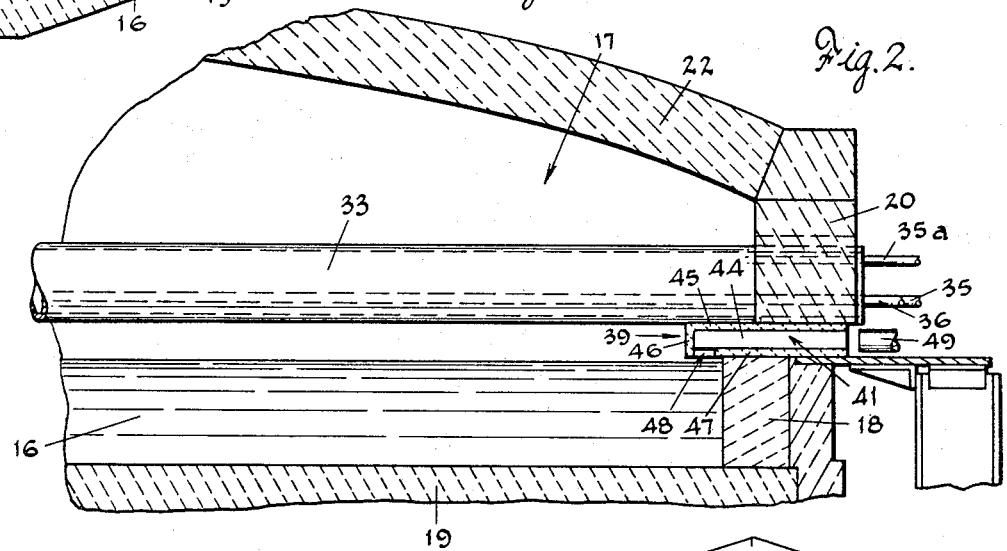
FIG. 2 is a transverse vertical section taken on line 2—2 of FIG. 1.
Figure 4:
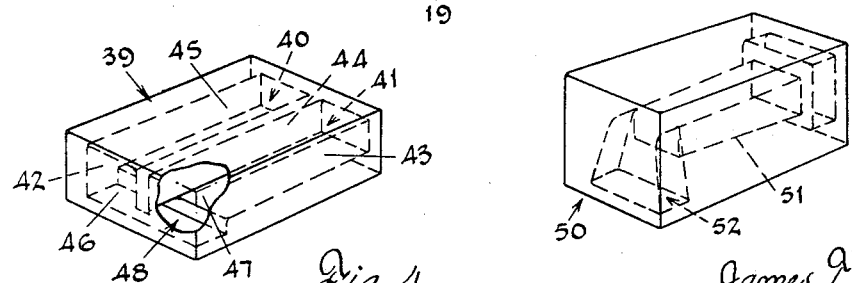
FIG. 4 is a perspective view of a refractory fire box.

As hereinabove described, the marginal areas of the glass are usually lower in temperature due to conduction of heat through the side walls 18, and to obtain a more uniform temperature across the stream of molten glass, it is herein proposed to provide additional sources of heat along the side walls which function to raise the temperature of the marginal areas to a degree level compatible with that of the central area and of the temperature required for proper working of the glass. These heat sources include so-called fire boxes of a refractory material located along the upper surfaces of the walls 18 in the vicinity of the end wall 21 adjacent or beneath the exit arch 23. The fire boxes 39 are formed, according to one embodiment, to include parallel passageways 40 and 41 that are defined by outer side walls 42 and 43, a central division wall 44, a top wall 45 and an end wall 46. The bottom wall 47 of the fire box is foreshortened in the area of the end wall 46 to provide a downwardly directed port 48 communicating with each of said passageways. As will be seen in FIG. 2, a burner 49 is located to direct heating flames into one or both of the passageways 41 and 42 and thereby provide sources of high heat downwardly onto the surface of the marginal areas of the glass. In the event that the flames are directed through only one passageway, the other passageway may be employed as a vent to carry off the products of combustion. As is usual in connection with burners for such purposes, controlled premixing of the gas and air provides a flame of extremely high temperature without objectionable residual products being exhausted into the atmosphere above the glass. In any event, the additional heat supplied to the marginal areas of the molten glass will raise the temperature as desired as the glass flows into the working receptacle or draw pot 24.

Figure 5:
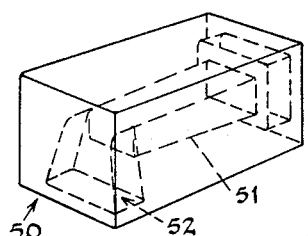
FIG. 5 is a perspective view of a modified form of fire box.

A modified type of fire box for the same purpose, designated by the numeral 50 in FIG. 5, is internally formed with an L-shaped passageway including a horizontal entry portion 51 and a downwardly directed port section 52. In practical use, the fire boxes 50 are adapted to be employed, when desired, as alternative forms for heating the marginal areas of the molten glass and in additional side areas of the cooling chamber in conjunction with the fire boxes 39 hereinabove described.

The area above the draw pot is separated from the actual drawing chamber 28 by means of front and rear lip-tiles 53 and 54 respectively, said drawing chamber being defined by the end wall 21, oppositely disposed side walls, one being indicated at 55, and a roof 56. The draw pot 24 is conventionally mounted on stools 57 in an enclosed pot chamber 58 which is suitably heated to maintain the pool of molten glass 25 at the desired working temperature.

The lip-tiles 53 and 54 function to shield the drawing chamber from the currents of hot air or other products of comubstion emanating from the cooling and/or draw-pot chambers and to direct rising currents of hot air downwardly toward the surface of the molten glass. Additionally, the opposed surfaces of the front and rear lip-tiles define a working area or forming zone 60 through which the upwardly drawn glass sheet or ribbon 26 moves. In this connection it will be appreciated that the tendency for the hot air currents to rise through the forming zone 60, in the vicinity of the rising sheet, is influenced to a great extent by the presence of sheet coolers 61 positioned adjacent the lip-tiles.

As the sheet is drawn upwardly from the pool 25 of molten glass through the base portion or meniscus 62, it is progressively reduced in thickness, and the speed at which the sheet or ribbon is drawn determines the ultimate thickness of the sheet. At the opposite edges of this upwardly moving sheet and in spaced relation above the surface of the pool of molten glass, pairs of knurled, driven rollers 63 are provided to engage the sheet and establish and maintain the width thereof as it becomes substantially set in transverse dimension and is deflected about the bending roll 27.

While utility of the front lip-tile 53 has hereinabove been ascribed to its function as a cover member above the draw pot 24, it is realized that this member is additionally positioned over the molten glass adjacent the end wall 21 of the cooling chamber 17 and consequently is adapted to serve as a further medium for influencing the temperature of the molten glass as it enters the working receptacle or draw pot 24. Thus, it is herein contemplated to provide a front lip-tile including a metal muffle member which may have a cover of refractory material thereover.

Figure 3:
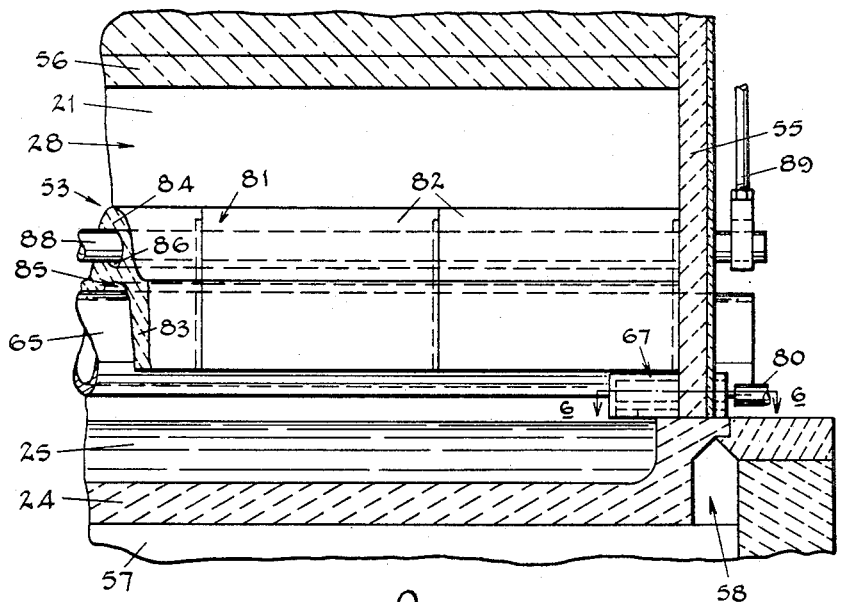
FIG. 3 is a transverse vertical section taken on line 3—3 of FIG. 1.

For this purpose, a preferred form of muffle, designated by the numeral 65 in FIGS. 1 and 3, is tubular or circular in cross-section and is made from centrifugally cast metal. According to conventional centrifugal casting processes, it is known that a quantity of molten metal when fed into a horizontally supported hollow mold will be caused by centrifugal force to spread over and cover the inner surface of the mold as it is rotated. The wall thickness of the casting can then be determined by continued pouring of the molten metal. Carefully applied controls employed during the casting operation also produce a wall structure wherein the granular or crystal orientation is uniformly regular throughout its entirety. Additionally, such wall structures are devoid of air pockets and pits as are experienced in so-called "static" casting methods. As herein employed for the cooling chamber muffle 33 and the lip-tile 65, it is not entirely necessary to further finish the inner or outer surfaces since such tubular castings have relatively smooth surfaces, and the wall thickness has been found sufficiently uniform for these functional purposes.

Generally speaking, since the tubular muffle has a cylindrical wall of uniform thickness, the tendency to warp in atmospheres of relatively high temperature is materially reduced. This is believed generally due to the fact that the uniformity of wall thickness and grain structure causes uniform response to thermal changes, which result in lineal growth of the tubular member rather than in irregular deformation at random localized areas between the ends. Moreover, when the muffle 65 is formed with an outside diameter of about 12″, a wall thickness on the order of ¾″ can be obtained which will materially add to the stiffness of the muffle so as to enable it to resist warpage. Such warping would be objectionable in the drawing of sheet glass since any deformation in a temperature controlling member could cause local temperature variations and develop streaking of the glass with resulting variations in thickness.

The oppositely disposed ends of the muffle 65 may be carried on the side walls in the conventional manner, but are preferably supported on fire boxes 67 and extend outwardly through the side walls 55 of the drawing chamber 28. Due to its hollow formation, the muffle is adapted to control the temperature of the molton glass entering the draw pot 24 and the air space above the entry end of the draw pot by supplying heat or coolant to establish any desired range of temperature, and particularly to regulate the temperature of the central area of the pool of molten glass. In addition to serving to support the muffle 65, the fire boxes 67 function to elevate the temperature of the marginal area of the molten glass, thereby aiding in maintaining the glass bodily within the desired range of working temperature.

Figure 6:
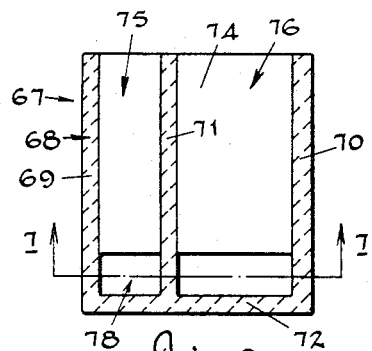
FIG. 6 is a horizontal section taken on line 6—6 of FIG. 3.
Figure 7:
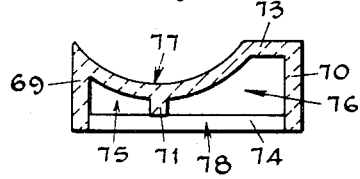
FIG. 7 is a transverse vertical section taken on line 7—7 of FIG. 6.

For these purposes, the fire boxes 67 have a body 68 including side walls 69 and 70 and a central wall 71 which, with an end wall 72, top wall 73 and bottom wall 74, define pasageways 75 and 76 as in FIG. 6. In FIG. 7, it will be seen that the top wall 73 has a curved or contoured section 77 conforming to the cylindrical surface of the muffle 65 for receiving the same saddle-wise therein.

As in the case of the fire boxes 39, the bottom wall 74 is foreshortened to form an opening port 78 with which the inner end of each passageway 75 and 76 is in open communication. As viewed in FIG. 3, a burner 80 is provided adjacent the outer end of the fire box to supply a flame source of heat into at least one passageway. Thus the heating flame will be directed from the passageway or passageways onto the surface of the molten glass through the opening 78 to heat the same. Alternatively, one passageway can function as a vent for exhausting the heated gases, thereby reducing the tendency for turbulency of air to exist above the glass surface. The fire box 67 in each instance is supported on the upper surface of the draw pot and extends through the related side wall of the drawing chamber.

Figure 8:
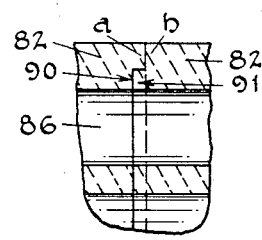
FIG. 8 is a fragmentary detail view.

The aforementioned refractory cover for the lip-tile muffle 65, indicated at 81, is generally formed of a series of sectional inserts 82, each in the shape of an inverted U with downwardly directed legs 83, which merge into the inner semi-curvature surface of web portion 84, to provide a housing area or recess 85 for the muffle. The web portion 84 of each unit 82 is formed with a passageway 86. As viewed in FIG. 3, the cover units 82 are supported by a rod or pipe 88 passed through the aligned passageways 86 and carried at its opposite ends by hanger rods 89 adjustably suspended from the framework of the furnace. To form the units 82 into a substantially unitary cover member, the ends of surfaces of each unit are initially provided with interlocking surface portions 90 and 91 as shown in FIG. 8. Thus the end surface $a$ of one unit is formed with a recess 90 that interfits, in abutting relation, with raised ledge or surface 91 on the surface $b$ of an adjoining unit.

In use, the refractory cover 81 is positioned with the outer surface of one leg 83 in substantial surface contact with the end wall 21 to seal the upper area of the drawing chamber from heated air currents rising through the exit arch 23. Additionally, the cover 81 surrounds the upper portion of the muffle 65 to protect the same from temperature differentials existent in the drawing chamber and above the draw-pot, and to restrict the heat transfer effects of the muffle to the molten glass therebelow. Such differentials of temperature could inevitably vary the temperature along the muffle, causing it to warp throughout its length. Since the muffle is circular, it can be periodically rotated within the recess 85 of the cover 81 to compensate for warpage in the event that slight warpage should occur. Periodic rotation of the muffle also progressively presents surface areas of its wall to conditions above the molten glass in the draw-pot, thereby reducing the tendency for one area to be exposed to the molten glass over a long period of use.

Figure 9:
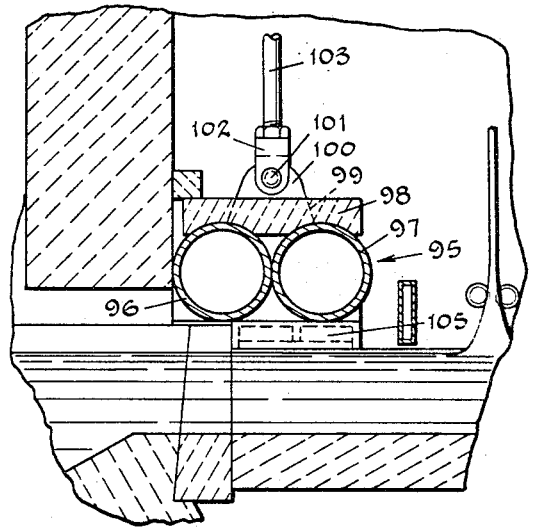
FIG. 9 is a fragmentary view of a modified form of the invention.

There is illustrated in FIG. 9 a modification of the preferred form of front lip-tile muffle construction heretofore described. This modified lip-tile, generally designated by the numeral 95, includes a pair of axially parallel dual tubular muffles 96 and 97. These dual muffles are provided with a refractory cover member 98 having curved lower surfaces which rest on the upper surfaces of the muffles to reduce heat transfer through the upper portions.

The cover member is provided with spaced vertical slots, as at 99, for receiving support plates 100 which are provided with openings to receive the pin 101 of a clevis 102 attached to the end of a hanger rod 103. The muffles 96 and 97, in the form of individual tubes, are supported adjacent their ends on fire boxes such as are indicated at 105.

As in the case of the muffle 65, the dual muffles 96 and 97 are of centrifugally cast metal to afford walls of the same desired physical characteristics. While the effective control surface area of the lip-tile is thus increased, a further advantage resides in utilization of the tubular muffles as individual and independent sources for temperature controlling media above the molten glass as it flows into the draw-pot. This permits positioning of heat sources in one muffle at one or more selected locations with respect to the width of the pool of glass and similar location of sources of coolant in the adjoining muffle. In this event, one or both of the muffles, while arranged in parallel relation, can be independently rotated as necessary to compensate for any slight warping or sagging which may occur.

It is to be understood that the forms of the invention herewith shown and described are to be taken as illustrative embodiments only of the same, and that various changes in the shape, size and arrangement of parts may be resorted to without departing from the spirit of the invention.

I claim:

1. Sheet glass drawing apparatus including a cooling chamber through which a stream of refined molten glass flows, a working receptacle in communication with said cooling chamber for receiving said stream of molten glass therefrom, said cooling chamber and working receptacle including a floor and opposite side walls, means for drawing a sheet upwardly from the molten glass in said working receptacle, a cylindrical muffle mounted above and transversely of said stream between the entrance to said cooling chamber and the upwardly rising sheet, a support member beneath each end of said muffle and resting on said side walls, said support members having means in their upper surface on which said end portions of said muffle are supported, and means associated with said support members for supplying heat to the molten glass adjacent said side walls.

2. Apparatus as defined in claim 1 in which there is provided a refractory cover for said muffle.

3. Apparatus as defined in claim 2 in which said refractory cover is shaped and positioned to surround the top and sides of said muffle.

4. Apparatus as defined in claim 1 in which there are provided heating means at opposite sides of said stream above the margins thereof and adjacent the discharge end of said cooling chamber, said heating means comprising hollow chambers having inlet and outlet openings and means for introducing a combustible fuel through said inlet openings.

5. Apparatus as defined in claim 4 in which said heating means are located with their discharge openings over and directed toward the margin of said stream.

6. Apparatus as defined in claim 1 in which said muffle is located between the exit end of said cooling chamber and the newly formed sheet.

7. Apparatus as defined in claim 1 in which the atmosphere over the molten glass in said cooling chamber is separated from the atmosphere over the molten glass in said working receptacle by a wall, and said muffle is located between said wall and the newly formed sheet.

8. Apparatus as defined in claim 7 in which heating means are provided above the margins of said stream and beneath said wall, said heating means comprising combustion chambers having entrance and exhaust openings, and means for supplying a combustible gas to said entrance openings.

9. Sheet glass drawing apparatus comprising a cooling chamber through which a stream of refined molten glass flows, a working receptacle in communication with said cooling chamber for receiving said stream of molten glass from said cooling chamber, said cooling chamber and working receptacle including a floor and opposite side walls defining the channel along which said stream flows, means for continuously drawing a sheet upwardly from the molten glass in said working receptacle, an end wall extending between said opposite side walls over said molten glass at the junction of said cooling chamber and said working receptacle, a cylindrical metallic muffle extending transversely of and above said stream of molten glass in the area between said end wall and the upwardly rising sheet, heat exchange means within said cylindrical muffle, and a fire box on each said side wall, said fire boxes having a curved upper surface within which the ends of said cylindrical muffle are supported for periodic rotation to compensate for warping of said muffle.

10. Sheet glass drawing apparatus as claimed in claim 9, in which said fire boxes include hollow chambers extending therethrough, said hollow chambers having inlet openings with means for introducing burners therein and outlet openings for directing heat into said molten glass along said side walls.

References Cited

UNITED STATES PATENTS

| | | | |
|---|---|---|---|
| 1,489,876 | 4/1924 | Whittemore | 65—203 |
| 1,634,802 | 7/1927 | Small et al. | 65—204 |
| 1,692,569 | 11/1928 | Reece | 65—204 |
| 1,953,341 | 4/1934 | Drake | 65—83 |
| 3,223,502 | 12/1965 | Ward et al. | 65—83 |
| 3,317,300 | 5/1967 | Prislan | 65—204 |

DONALL H. SYLVESTER, *Primary Examiner.*

R. V. FISHER, *Assistant Examiner.*